US007809951B2

(12) United States Patent
Hellenthal

(10) Patent No.: US 7,809,951 B2
(45) **Date of Patent: *Oct. 5, 2010**

(54) SYSTEM AND METHOD FOR AUTOMATED BORDER-CROSSING CHECKS

(75) Inventor: Markus Hellenthal, Boppard (DE)

(73) Assignee: Accenture GmbH, Kronberg Im Tanus (DE)

( * ) Notice: Subject to any disclaimer, the term of this patent is extended or adjusted under 35 U.S.C. 154(b) by 243 days.

This patent is subject to a terminal disclaimer.

(21) Appl. No.: 11/900,677

(22) Filed: Sep. 13, 2007

(65) Prior Publication Data

US 2008/0010464 A1 Jan. 10, 2008

Related U.S. Application Data

(63) Continuation of application No. 10/130,377, filed as application No. PCT/DE00/04004 on Nov. 14, 2000, now Pat. No. 7,272,721.

(30) Foreign Application Priority Data

Nov. 19, 1999 (DE) ................................ 199 57 283
Dec. 20, 1999 (DE) ................................ 199 61 403

(51) Int. Cl.
*H04L 9/00* (2006.01)
*H04L 9/32* (2006.01)

(52) U.S. Cl. ............................ 713/182; 713/186; 726/2

(58) Field of Classification Search ................. 713/168, 713/172, 176, 182, 186; 726/2, 4, 27–30; 382/115–118, 124
See application file for complete search history.

(56) References Cited

U.S. PATENT DOCUMENTS

| | | | |
|---|---|---|---|
| 4,586,441 A | 5/1986 | Zekich | |
| 4,847,485 A | 7/1989 | Koelsch | |
| 4,993,068 A | 2/1991 | Piosenka et al. | |
| 5,095,196 A | 3/1992 | Miyata | |
| 6,003,014 A | 12/1999 | Lee et al. | |
| 6,085,976 A * | 7/2000 | Sehr | 235/384 |
| 6,360,953 B1 | 3/2002 | Lin et al. | |
| 6,867,683 B2 | 3/2005 | Calvesio et al. | |
| 7,272,721 B1 * | 9/2007 | Hellenthal | 713/182 |

FOREIGN PATENT DOCUMENTS

| | | |
|---|---|---|
| EP | 0 599 291 A2 | 6/1994 |
| EP | 0 762 340 A2 | 3/1997 |
| WO | WO 99/16024 | 4/1999 |

* cited by examiner

*Primary Examiner*—Hosuk Song
(74) *Attorney, Agent, or Firm*—Brinks Hofer Gilson & Lione

(57) ABSTRACT

System and method for automated border-crossing checks of a personal data recording device, a biometry data recording device, a personal data transmission device, a data storage device, a transit gate (10), an isolation device, a data reading device, an authenticity testing device, a data manipulation testing device, a device for opening of the entrance (12) of transit gate (10), a biometry data recording device, a comparison device, an alarm triggering device, a personal data transmission device and a device for opening the exit of the transit gate (10) and a method for automated border-crossing checks.

17 Claims, 2 Drawing Sheets

SYSTEM AND METHOD FOR AUTOMATED BORDER-CROSSING CHECKS

CROSS-REFERENCE TO RELATED APPLICATIONS

This application is a continuation of U.S. application Ser. No. 10/130,377, filed on Jun. 10, 2002, issued as U.S. Pat. No. 7,272,721, incorporated herein by reference, which is a 35 U.S.C. §371 national state filing of International Patent Application No. PCT/DE00/04004 filed Nov. 14, 2000, which claims priority benefit of German Patent Application No. 19957283.6, filed Nov. 19, 1999, and German Patent Application No. 19961403.2 filed Dec. 20, 1999.

FIELD OF THE DISCLOSURE

The present invention concerns a system and method for automated border-crossing checks.

BACKGROUND OF THE INVENTION

Border checks, for example, at airports, but also in road and ferry traffic, are time-critical for the personal traffic crossing the border. The expense for the control authorities, among other things, because of the Schengen agreement in recent years, has simultaneously risen disproportionately to the number of travelers. The mobility of people that has been increasing for years and the increasing numbers of passengers in international air traffic are leading to new requirements in personal transport. On the other hand, the personnel and financial resources of state control authorities, air transport companies and airport operators, as well as the spatial circumstances at many international airports, are increasingly limited.

BRIEF SUMMARY OF THE INVENTION

The underlying task of the invention is therefore to increase the speed of passenger traffic.

This task is solved according to the invention by a system for automated border crossing checks, with: a device to record personal data of system users; a device to record biometric data of system users; a device to convey the personal data of the system users to a wanted list data bank, and to inquire whether the corresponding system user is on a wanted list; a device for storage of data, including the personal data and biometric data of corresponding system users, on an identification medium provided for each system user and optionally data specific to the identification medium, if the result of the wanted list inquiry is negative; a transit gate arranged in front of a boundary, to control transit of system users with an entrance and an exit, in which the entrance and exit are closed in the base position; a device for isolation of system users arranged in front of the entrance to the transit gate; a device to read data stored on the identification media, arranged behind the isolation device, but in front of the entrance to the transit gate; a device the check the authenticity of the identification media, arranged in front of the entrance to the transit gate; a device to check the presence of data manipulation on the corresponding identification medium, arranged in front of the entrance to the transmit gate; a device for opening the entrance to the transit gate when the authenticity of the corresponding identification medium and no data manipulation on the corresponding identification have been established; a device to record biometric data of an admitted system user, situated in the transit gate; a device for comparison of the recorded biometric data with the biometric data stored on the identification medium of the admitted system user; a device for triggering an alarm signal when the recorded and stored biometric data on the corresponding identification medium do not correspond; a device to transmit personal data to the wanted list data bank, and to inquire whether the system user is on a wanted list; a device for opening the exit of the transit gate and permitting border crossing of the system user when the result of the wanted list inquiry is negative, and to trigger an alarm signal when the result of the wanted list inquiry is positive.

The task is also solved by a method for automated border-crossing checks that comprises the following steps: Recording of personal data of system users; Recording of biometric data of system users; Transmitting of personal data of system users to a wanted list database and making an inquiry whether the corresponding system user is on a wanted list; Storage of data, including the personal data and biometric data of the corresponding system user, on an identification medium provided for each system user and optionally data specific to the identification medium, when the result of the wanted list inquiry is negative; Isolation of a system user being subject to border-crossing examination in front of a transit gate with an entrance and an exit, in which the entrance and exit are closed in the base position; Reading of data stored on the identification medium; Checking of the authenticity of the corresponding identification medium; Checking of the presence of data manipulation on the corresponding identification medium; Opening of the entrance to the transit gate when the authenticity of the corresponding identification medium and no data manipulation on the corresponding identification medium are established; Recording of biometric data of a system user admitted to the transit gate, comparison of the recorded biometric data with the biometric data stored on the identification medium of the admitted system user; Triggering of an alarm signal when a recorded and stored biometric data on the corresponding identification medium do not correspond; Transmitting of personal data to the wanted list data bank and inquiring whether the system user is on a wanted list; and Opening of the exit of the transit gate when the result of the wanted list inquiry is negative, or triggering of an alarm signal when the result of the wanted list inquiry is positive.

In particular, it can be prescribed in the system that the device for recording personal data of system users have a device for automatic entry of personal data. For example, the device for automatic entry of personal data can be a scanner.

The device for recording biometric data advantageously includes a device for recording of a fingerprint and/or retinal structure and/or facial characteristics and/or voice and/or language of a corresponding system user.

Another special variant of the system is characterized by a device for processing the recorded biometric data and conversion into one or more representative data features, by means of which recognition of the system user is possible during the check.

It can also be prescribed that the device for storage of data have a device for encryption of personal and/or identification medium data, and to generate a code specific to the identification medium.

It can also be prescribed that the encryption device be a locally provided security module or is situated in a background system connected via an online data connection.

The device for storage of data preferably has a device for electrical personalization of the encrypted data in the identification medium and/or a device for application of personal data and optionally a photo, as well as signature of the corresponding system user, to the identification medium. For example, the personal data can be applied in thermotransfer printing to the identification medium.

The device for storage of data favorably has a device for covering the identification medium with a laminate film. The identification medium becomes counterfeit-proof by the laminated film.

The identification media are preferably Smart Cards.

At least one video camera is favorably provided in the transit gate. This permits monitoring of the transit gate, especially with respect to performing effective isolation.

It can additionally be prescribed that the device for reading the data stored on the identification media have a device for calculation of a code specific to the identification medium from the encrypted identification medium data and its verification. Performance of card legitimization testing is therefore possible.

The device for reading the data stored on the identification medium also preferably has a device for decoding the encrypted personal data and their verification. This permits personal legitimization testing.

Another special variant of the invention is characterized by a device for generation and distribution of codes for data encryption and monitoring of system operation. Such a device fills the function of a trust center.

Another special variant of the invention is characterized by a device for managing and monitoring the lifetime of all identification media issued to system users.

Finally, another special variant of the invention is characterized by a device for encryption of data transferred between devices of the system and/or between the system and external devices. This is supposed to protect against unauthorized access to the transmitted data.

Dependent Claims concern advantageous modifications of the method according to the invention.

The invention is based on the surprising finding that acceleration and simplification of border traffic is achieved by integration of official checks in the overall process, during which part of the check is, in principle, moved forward, without the quality of the check suffering from this. Because of the at least partly moved forward check, border checking with respect to unproblematical travelers that have already been checked beforehand can be simplified and shortened, so that concentration of police and border forces on potential criminals and hazards becomes possible.

The check conducted beforehand permits mechanical checking of border-crossing travelers who are unproblematical, in terms of the police, with all the individual components that border checking by police officials also includes, namely, personal comparison, authenticity checking of border-crossing documents, wanted list inquiry, permission for border-crossing. Considering all national, Schengen and EU requirements, travelers who are classified as unproblematical beforehand, from a police standpoint, are mechanically identified and subjected to a police check via an online wanted list inquiry, after application and on a voluntary basis by means of personal data and biometric data stored in the identification media during border-crossing.

Additional features and advantages of the invention are apparent from the claims and the subsequent description, in which a practical example is explained in detail with reference to the schematic drawings.

DETAILED DESCRIPTION OF THE INVENTION

Figure 1:
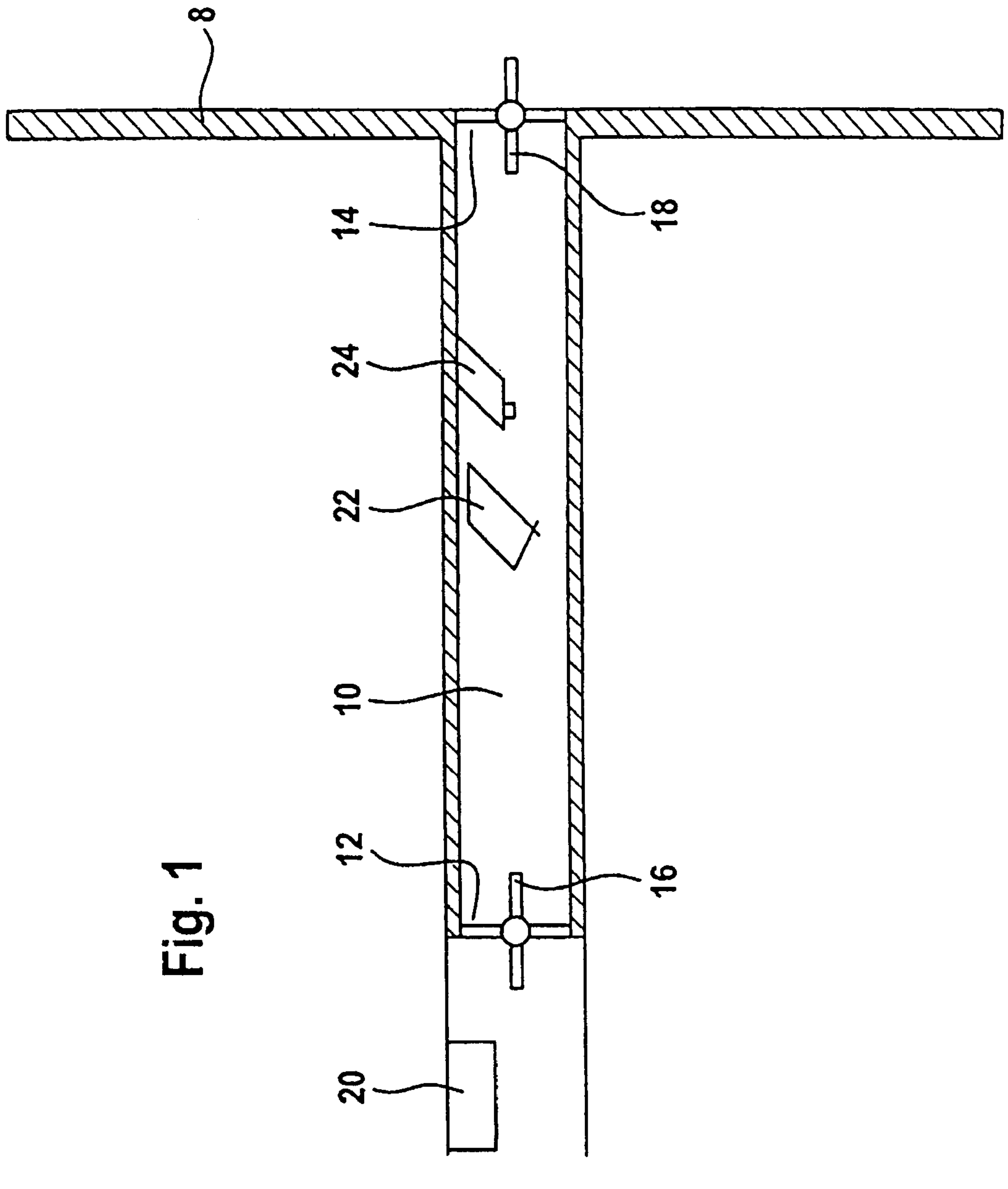
FIG. 1 shows a top view of part of the system according to a special variant of the present invention.

FIG. 1 shows a top view of part of a system according to a special variant of the invention. The depicted part concerns checking of system users directly at a border (for example, country frontier). FIG. 1 shows a transit gate 10 with an entrance 12 and an exit 14. The entrance 12 and the exit 14 are each provided with a revolving door 16 and 18. A device for isolation of the system users (not shown) is situated in front of revolving door 16 at entrance 12. Isolation can be carried out mechanically, but also optically, for example. A traffic signal, for example, can be used for this purpose. When the traffic signal is green, an individual person may pass. If a person continues when the light is red, an optical and/or acoustic alarm is triggered. A card reading device 20 to read Smart Cards is situated between this device and revolving door 16. Revolving door 16 is locked in the base position and therefore closes off entrance 12. A biometry data reading device 22 is situated in the transit gate 10. The card reader 20 and the biometry data reader 22 are connected to a local server of the border police (not shown). A video camera 24 to monitor mechanical isolation of system users is also situated in the transit gate 10.

Figure 2:
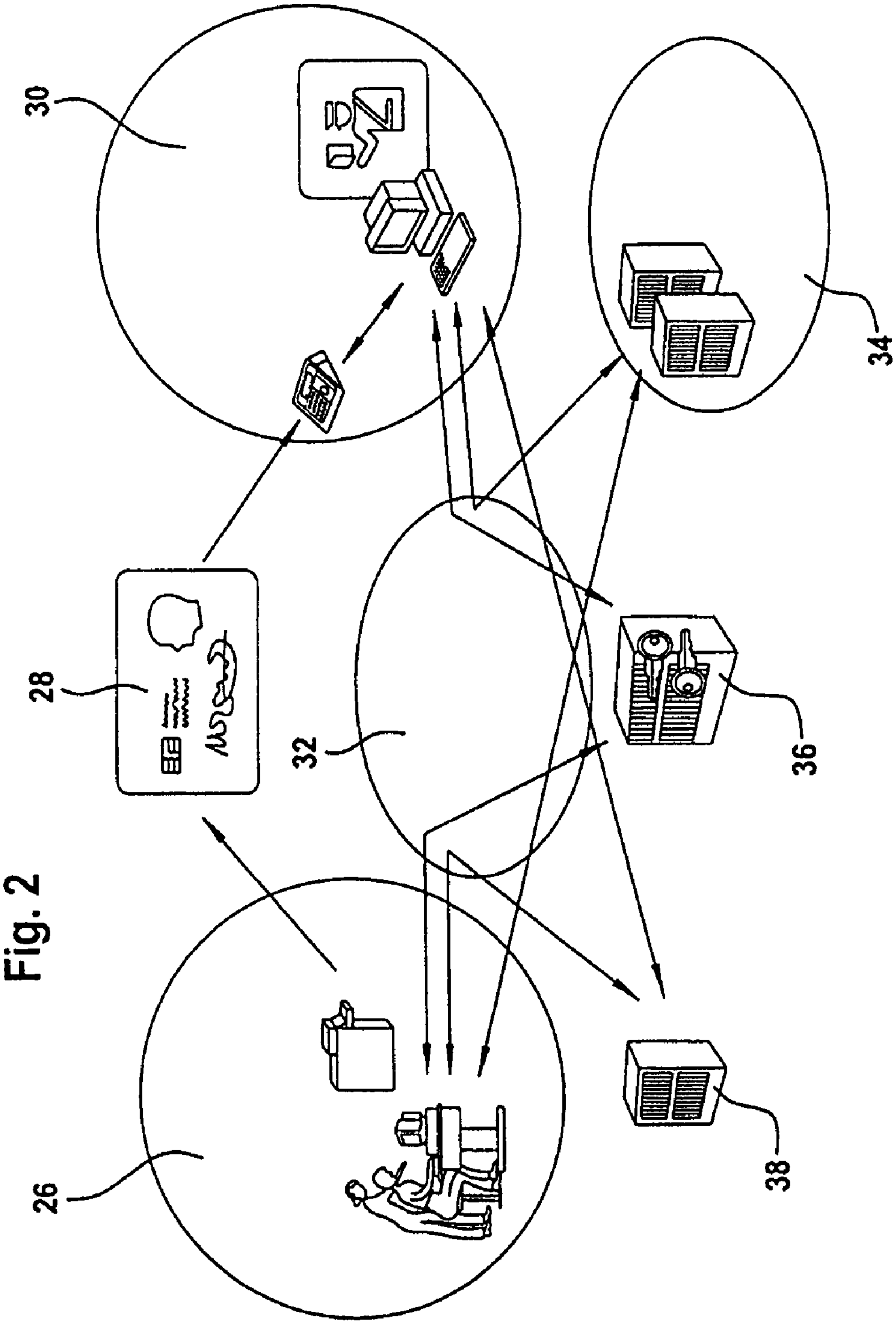
FIG. 2 schematically depicts essential devices and device units of the system.

The essential devices of the system are shown, individually in blocks, schematically in FIG. 2. A system block provided with reference number 26 concerns application and issuing of a card (so-called enrollment center). The card, in the form of a Smart Card 28, serves as authorization identification for each system user. It is checked during border-crossing in the part of the system depicted in FIG. 1, which is referred to here as a decentralized, automated border check system 30. The decentralized, automated border check system 30 comprises a local server of the border police, which is connected, via a department server 32 of the border police, to a wanted list database 34 of INPOL, a trust center 36, a central data management device 38 of the border police and the enrollment center 26.

Card application can be carried out in the enrollment center 26. This includes all process steps necessary for recording of potential system users, especially recording of their personal and biometric data. Several enrollment centers can be provided, which are set up at different locations. For card application, a potential system user presents his border-crossing document, from which the operator of a PC, on which the recording software is running, records the data automatically and manually. The data set is printed out on a form and signed by the potential system user submitting the request. The form contains, among other things, the following additional information: a description of the system, the personal data of the potential system user, the conditions for voluntary participation in the system, the necessary data protection declarations for producing, storing, transferring and processing the personal data of potential system users submitting applications, in conjunction with automated border checking, an indication of the obligation of the system user to carry a valid border-crossing document on each border crossing, and instructions concerning the recognized purposes of travel, for which the system may be used.

In the next step, the fingerprint of a potential system user is recorded by a fingerprint reader (not shown). The data recovered by the fingerprint reader are converted by the processing software to one or more representative data features, by means of which recognition of the system user is possible during border checking. A test for duplicates is then conducted, i.e., it is checked whether the applicant is already recorded in the system. The personal data recorded beforehand are supplemented by biometric data and sent to encryption. This occurs either in the local system in a security module prescribed for this or in a background system, to which an online data connection is connected for this purpose. The encrypted data are electrically personalized in the enrollment center in a Smart Card blank and the personal data applied to the Smart Card body in thermotransfer printing. A photo of the system user, as well as his personal data (both, if required, as a basis for manual checking, for example, in the context of random checks), his signature and the name of the enrollment center can also optionally be printed. The Smart Card body is then coated with a counterfeit-proof laminate film. All these steps occur in a machine and are monitored by a PC. After function checking at a terminal in the enrollment center, the Smart Card is issued to the system user. The entire enrollment takes less than 10 minutes. The card application and issuing can also be carried out simultaneously with first use of the system on location at the border.

All sovereign steps—execution of advanced border control according to national, Schengen and EU requirements and release of the Smart Card, are entrusted to an official of the border authorities. He is optionally supported by personnel or employees of the operator. Appropriate access controls are also prescribed for the employees in the enrollment center.

The recording software also ensures that Smart Cards are only prepared with the involvement of legitimated border control officials, only after successful completion of all required steps and only for nationals of specific admitted states exempted from visa, who are in possession of a valid travel document.

Card control includes all the processes that are carried out during checking of the cardholder in the context of entry. Card control occurs within a transit gate 10 (see FIG. 10) that the person being checked must walk through.

The transit gate itself can be integrated without problem in the existing infrastructure, i.e., only limited construction changes are required. The local server serves for process control and communication with external computers.

A mechanical isolation initially occurs before the transit gate 10 by means of a device for mechanical installation (not shown), in order to prevent entry of unauthorized, as well as several persons at the same time. This expedient is supplemented by the use of a video camera 24 in the transit gate 10 and corresponding image evaluation software.

After the device for isolation, but before entrance 12, the person being checked is required to introduce the Smart Card to a card reader 20. A security module (not shown), for authenticity checking of the Smart Card and the personal data stored on it, is situated in the card reader 20. Each authentic Smart Card has a Smart Card-specific code, which can be calculated, based on specific Smart Card data, by the security module in card reader 20 and then verified. Communication between the Smart Card and the security module and the card reader 20 is additionally protected with a temporary code that was issued beforehand between the Smart Card and the security module.

The personal data, including biometric data, are then read from the Smart Card and an appended signature (MAC) checked for authenticity, by means of the public code in the security module. Illegal data manipulation can thus be reliably recognized.

If the authenticity of the card and the presence of no data manipulation are verified, the revolving door 16 is rotated, so that the person can enter the transit gate. In transit gate 10, the fingerprint of the system user is taken by means of the biometry data reader 2 and a comparison carried out with the biometric data stored on his Smart Card. For this purpose, extracts are formed from the locally recovered data and compared with the data features stored in the Smart Card.

By this two-stage checking process at the entrance to the transit gate and within it, two things are achieved. It is established that the person who was granted entry based on the Smart Check checked at the entrance to the transit gate is an authorized system user. Also, the entrance into the transit gate is denied to unauthorized persons; it is sufficient here to place an instruction on the screen on the card reader at the entrance to the transit gate that regular border control must be passed through. Abusive users or authorized persons erroneously rejected by the system (this cannot be 100% ruled out by any technical system) are reliably established, at the latest, in the transit gate. After corresponding automatic alarm triggering by the system, intervention by the border control authorities or an official would be required here, in order to release the person from the transit gate and send him to regular border control.

In the next step, the required personal data are conveyed via the local server of the border police for checking to a wanted list database of INPOL.

If all the steps just described are passed through without objection, the exit of the transit gate is opened. In the case of an objection or incorrect behavior of the system, an alarm is triggered and checking of the person continued by personnel of the border police.

The configuration of the transit gate, the type of employed isolation technology and release at the exit of the transit gate can be determined as a function of, for example, ergonomics and the handling of large traffic flows.

The trust center 36 serves as a central system component for managing all security-relevant aspects of the system, i.e., especially for generation and distribution of codes and monitoring of continuous system operations.

The central data management device 38 of the border police serves for management of all issued Smart Cards with functions for monitoring of the card life cycle. Card management also includes the functions for application processing, i.e., recording of personal data and biometric data.

The special sensitivity of the data of the Smart Cards and the functionality connected to it require a high degree of protection against counterfeiting of personal data on the Smart Card, counterfeiting of biometric data, counterfeiting of the connection between biometric data and personal data, manipulations on a control terminal, manipulations during recording of personal data and biometric data, and attacks on the cryptographic functions in the system.

For extensive avoidance of these risks, a shell-like security architecture is advisable to secure the central information and functions. The purpose of the architecture is the erection of several hurdles that a potential attacker must overcome, in order to manipulate the system.

The personal data, together with the biometric data, form the core. These data are viewed as a unit in the system, i.e., biometric data are an element of the personal data set. Via the personal data set, initially by means of a secure hash process, for example, the SHA-1 algorithm, a cryptographic test sum is generated. This 160 bit long value has the typical properties of a good hash algorithm, i.e., it is essentially collision-free. The result of the algorithm is used as part of the cryptogram formation, since the entire personal data set is too large as input data for encryption. The hash value compresses the contents of the personal data set to a strongly reduced form. A conclusion concerning the original data cannot be drawn from the hash value. Changes in the personal data set necessarily produce a change in the hash value. The secure hash process is not an encryption process, i.e., it does not use codes.

Essential extracts in personal data (for example, name, date of birth and location of birth), especially the data for inquiry in the INPOL wanted list database, are encrypted in the second shell, together with the hash value, with a private key method. Depending on further detail adjustments, RSA with a code length of at least 1024 bit or elliptic curves with sufficient code length should be used as private key method.

For encryption of the extract, the private code of an issuing site or the private code of a central authority is used. In the latter case, the personal data set must be sent to the central authority for encryption, and only then can it be personalized in the Smart Card (for example, by online query).

For decoding of the extract, the public code is required. This is entered in the control terminal. Decoding initially produces the personal data for the INPOL inquiry and the hash value. The hash value is compared with a newly calculated hash value. When they are equivalent, a non-counterfeited data set can be assumed.

A number of variants are possible within the system, utilization of which depends on specific boundary conditions. A distinct Smart Card number could be included in the personal data set and linked to it. Transfer of data to another Smart Card would therefore be impossible. Proper use of this option requires an online personalization, in which the personal data and Smart Card number are encrypted and directly personalized in the Smart Card. Encryption of the personal data set can be carried out with the private code of the issuing site. This would then store its public code in the Smart Card. A control station would then use the public code of the issuing site furnished by the Smart Card for verification of the extract. To prevent misuse, say, the making of counterfeit public codes of an issuing site, the code pairs of the issuing site must be electronically signed by a central authority. This process permits issuing of the Smart Card without access and authorization through a central system.

Each Smart Card in a system acquires a distinct series number during production. This series number is the basis of a cryptographic process that is actively carried out by the Smart Card. The Smart Card contains a Smart Card-specific code for authentication, obtained by derivation of the series number among a master code.

Authentication implicitly occurs by reading the personal data in the so-called PRO mode. The PRO mode is a variant of reading access introduced in IS007816, in which the data transmitted to the terminal are secured by a message authentication code (MAC). This MAC is newly generated dynamically during each reading access, in order to rule out a so-called replay attack, i.e., the re-entry of already read data.

The generation of The MAC occurs within the operating system of the Smart Card, using the card-individual authentication code and a random number delivered by the terminal. The terminal contains for this purpose a random number generator and a master code, used to derive the Smart Card code under the Smart Card series number in a security module (for example, another Smart Card). The terminal independently and immediately after reading of the Smart Card data checks the MAC and rejects a card with an incorrect MAC.

It is important in this context that the Mac be generated dynamically by the Smart Card. The code required for this must be present in the Smart Card. Manipulation of the Smart Card, for example, by duplication, requires access to this card code, which is only possible with considerable financial expense.

There is also a variant for this security step that presumes a more high-performance Smart Card, however. Instead of a symmetric method for MAC formation (generally triple DES), the asymmetric method of elliptic curves can be used. In this method, the private-card-individual code is stored readout-protected in the card and the public card made readable. The public code must be signed with the private code of the system operator. The control terminal now need only store the few security-critical public codes of the system operator and use them to check the authenticity of the card individual public codes.

Readout of the data occurs in similar fashion to the symmetric method, with the deviation that the MAC is generated by the symmetric algorithm.

Such methods, based on asymmetric cryptography, find only limited use in Smart Cards, because of their high demands on computer performance. The response time behavior of such a solution must be considered here in detail.

Transmission of data between the devices of the system, especially transmission of data during card issuing, should be secured by cryptographic methods. The method of line encryption offers itself for this purpose, with which protected, transparent data channels can be constructed.

The integrity of the data and confidentiality can be ensured with this method. The latter is of particular significance in the generation and distribution of system codes.

An essential, often underestimated mechanism to secure information systems is embedding of the technical system in a reliable process organization ($5^{th}$ shell). The best and longest code methods of the world accomplish nothing, if the codes are simply accessible. Technical methods can only offer limited protection here and are often at the mercy of attack from the outside without protection.

Another feature of the $5^{th}$ shell is the intention to place all security-relevant system devices within the care of the border control authority. Because of this, it is guaranteed, from the standpoint of the authorities, that access to these system devices is not possible under any circumstances without their involvement. For this purpose, not all system devices actually need be situated in the facilities of the authority. The technical operation could also be carried out by an employee of the authority, as long as unauthorized access by third parties (including the operator) is impossible by corresponding contractual guarantee clauses.

An additional organizational protective precaution consists of the fact that all sovereign steps, i.e., the performance of the advanced border control according to the national, Schengen and EU requirements and release of the Smart Card, is entrusted to officials of the border patrol authority. Appropriate access controls exist for them and for the other employees in the enrollment center.

The recording software also ensures that Smart Cards are prepared only on the basis of known Smart Card blanks already in the system (each Smart Card blank has a unique card number), only with involvement of legitimized border control officials in the system, only after successful passage through all required steps, and only for nationals of specific admitted states, who are in possession of the valid travel documents.

The systems according to the invention have some advantages that distinguish them from other different unsuccessful attempts for surface-covering introduction of automated border checks. The system represents an effective and economical possibility of making border control authorities more efficient. The system permits border control forces to focus on groups of persons that are relevant from a police standpoint. They can therefore offer more security and service with lower costs. The Smart Card, used according to a special variant of the invention, permits storage of also sensitive data without the risk of misuse by unpermitted changes or counterfeiting. The method permits the shortest possible transaction times (essentially depending only on the response-time behavior of the inquiry in the INPOL wanted list database). The method permits the lowest possible transaction costs. The method has no problems from the standpoint of data protection (the owner carries his own personal related data, reliably protected against unauthorized access). The Smart Card, used in a special variant of the invention, contains sufficient storage capacity for this and optionally other future applications with additional useful potential. Sufficient room is situated on the Smart Card, used in a special variant of the invention, in order to optionally use additional security features (for example, machine-readable hologram with microprint) or other storage variants.

The features of the invention, disclosed in the above description, in the drawings and claims, can be essential both individual and in any combinations for implementation of the invention in its different variants.

REFERENCE LIST

8 Border
10 Transit gate
12 Entrance
14 Exit
16, 18 Revolving door
20 Card reader
22 Biometry data reader
24 Video camera
26 Enrollment center
28 Smart Card
30 Decentralized, automated border control system
32 Office server
34 Wanted list database
36 Trust center
38 Centralized data management device

What is claimed is:

1. A system comprising:

a transit gate having, in order, an entrance, a walkthrough passage, and an exit, wherein the entrance and exit are closed in a base position;

a card reading device located outside the walkthrough passage to read identification data from an identification card, wherein the card reading device is in communication with a security module to determine whether the identification card is legitimate and allow the entrance to open;

a biometry reading device located within the walkthrough passage, to obtain first biometry data directly from an individual; and a server configured to compare the first biometry data to second biometry data read from the identification card by the card reading device, compare the identity obtained from the identification card to a list of identities, and open the exit if the identity is not on the list of identities.

2. The system of claim 1 wherein the list of identities is a wanted list maintained by a police agency.

3. The system of claim 1 wherein the card reading device is configured to calculate and verify an identification medium-specific code of the identification card.

4. The system of claim 1 wherein the card reading device is configured to decode encoded data read from the identification card to obtain the identification data.

5. The system of claim 1 wherein the card reading device is configured to decode encoded data-read from the identification card to obtain a first hash value and a first personal data set, calculate a second hash value based upon a second personal data set, and compares the first hash value to the second hash value.

6. The system of claim 5 wherein the first personal data set is a subset of the second personal data set.

7. The system of claim 1 wherein the card reading device is configured to determine whether the identification data has been manipulated.

8. The system of claim 1 wherein the entrance and the exit each include a revolving door.

9. The system of claim 1 wherein the server is configured to open the exit upon verification of the biometry data with the second biometry data.

10. The system of claim 1 wherein the walkthrough passage is enclosed on its sides.

11. The system of claim 1 wherein the entrance, the walkthrough passage and the entrance are connected when the entrance and the exit are closed in the base position.

12. A method, comprising:

receiving identification data, by decoding encoded data from an identification card, comprising personal data and first biometry data;

determining whether the personal data and the first biometry data have been manipulated;

isolating an individual in a transit gate between an entrance and an exit that are closed in a base position wherein the transit gate has a device to obtain biometry data, and obtaining second biometry data directly from the individual;

comparing the first biometry data to the second biometry data;

comparing the personal data to a list; and allowing the individual to exit the transit gate only if the individual is not identified on the list.

13. The method of claim 12 further comprising calculating and verifying an identification medium-specific code of an identification card having the identification data.

14. The method of claim 12 further comprising:

decoding encoded data read from an identification card to obtain a first hash value and a first personal data set;

calculating a second hash value based upon a second personal data set; and comparing the first hash value to the second hash value.

15. The method of claim 12 wherein the first personal data set id a subset of the second personal data set.

16. The method of claim 12, wherein if the individual is not identified on the list, causing the exit to change to an open position to allow the individual to exit.

17. The method of claim 16, wherein after verifying the identification data, causing the entrance to change to an open position to allow the individual to enter the transit gate, and causing the entrance to close after the individual has entered the transit gate.

* * * * *